US012439224B2

(12) United States Patent
Balasubramanian et al.

(10) Patent No.: US 12,439,224 B2
(45) Date of Patent: Oct. 7, 2025

(54) TECHNIQUES FOR CONFIGURING TRANSMISSION OF A POSITION MESSAGE

(71) Applicant: QUALCOMM Incorporated, San Diego, CA (US)

(72) Inventors: Anantharaman Balasubramanian, San Diego, CA (US); Dan Vassilovski, Del Mar, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 17/531,431

(22) Filed: Nov. 19, 2021

(65) Prior Publication Data
US 2023/0164519 A1 May 25, 2023

(51) Int. Cl.
*H04W 4/029* (2018.01)
*H04W 4/02* (2018.01)
*H04W 72/20* (2023.01)

(52) U.S. Cl.
CPC .......... *H04W 4/029* (2018.02); *H04W 4/023* (2013.01); *H04W 72/20* (2023.01)

(58) Field of Classification Search
CPC ...... H04W 4/029; H04W 72/20; H04W 4/023
USPC ...................................................... 455/456.1
See application file for complete search history.

(56) References Cited

U.S. PATENT DOCUMENTS

| 8,509,764 B2* | 8/2013 | McNew | H04B 17/309 455/431 |
|---|---|---|---|
| 2017/0289733 A1* | 10/2017 | Rajagopal | H04L 5/0033 |
| 2018/0096605 A1* | 4/2018 | Bai | B60Q 1/525 |
| 2018/0365909 A1* | 12/2018 | Cheng | H04Q 9/00 |
| 2020/0193829 A1* | 6/2020 | Cheng | G08G 1/168 |

* cited by examiner

Primary Examiner — Ahmad F. Matar
Assistant Examiner — Jirapon Tulop
(74) Attorney, Agent, or Firm — Holland & Hart LLP

(57) ABSTRACT

Methods, systems, and devices for wireless communications are described. A user equipment (UE) (e.g., a vehicle, low-power sensor) may identify that the UE satisfies a set of conditions for a stationary state. The stationary state may be associated with a configuration for transmitting a position message (e.g., a basic safety message (BSM)) while the UE satisfies the stationary state. The UE may identify a periodicity at which to transmit the position message based on the UE satisfying the set of conditions for the stationary state, where the periodicity associated with a stationary state may be larger than a periodicity associated with a non-stationary state. The UE may transmit (e.g., broadcast) the position message over a sidelink in accordance with the configuration and based on identifying that the UE satisfies the set of conditions for the stationary state.

29 Claims, 11 Drawing Sheets

TECHNIQUES FOR CONFIGURING TRANSMISSION OF A POSITION MESSAGE

FIELD OF TECHNOLOGY

The following relates to wireless communications, including techniques for configuring transmission of a position message.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a first UE, such as a vehicle, may be configured to transmit (e.g., broadcast) a position message, such as a basic safety message (BSM), periodically. The position message may serve to alert nearby UEs of the presence of the first UE and may indicate a set of parameters associated with the first UE. Accordingly, a nearby UE may receive the position message and determine whether to adjust parameters of the nearby UE, such as to avoid a collision with the first UE. Techniques associated with transmitting the position message may be improved.

SUMMARY

The described techniques relate to improved methods, systems, devices, and apparatuses that support techniques for configuring transmission of a position message. Generally, the described techniques provide for improved methods of transmitting position messages (e.g., basic safety messages (BSMs)). In accordance with the techniques described herein, a user equipment (UE), such as a vehicle, may determine whether the UE is stationary (e.g., non-mobile, in a parked state, in an off state, or a combination thereof). If the UE meets the conditions of a stationary state, the UE may determine a configuration for transmitting (e.g., broadcasting) a position message. In some cases, the configuration for transmitting the position message may be based on satisfying a stationary state, a location of the UE, parameters associated with nearby UEs, environmental conditions, etc. For example, the UE may identify a periodicity at which to transmit the position message based on the UE satisfying the set of conditions for the stationary state, where the periodicity associated with a stationary state may be greater than a periodicity associated with a non-stationary state.

A method for wireless communications at a UE is described. The method may include identifying that the UE satisfies a set of conditions for a stationary state, where the stationary state is associated with a configuration for transmitting a position message while the UE satisfies the stationary state and transmitting the position message over a sidelink in accordance with the configuration and based on identifying that the UE satisfies the set of conditions for the stationary state.

An apparatus for wireless communications at a UE is described. The apparatus may include a processor, memory coupled with the processor, and instructions stored in the memory. The instructions may be executable by the processor to cause the apparatus to identify that the UE satisfies a set of conditions for a stationary state, where the stationary state is associated with a configuration for transmitting a position message while the UE satisfies the stationary state and transmit the position message over a sidelink in accordance with the configuration and based on identifying that the UE satisfies the set of conditions for the stationary state.

Another apparatus for wireless communications at a UE is described. The apparatus may include means for identifying that the UE satisfies a set of conditions for a stationary state, where the stationary state is associated with a configuration for transmitting a position message while the UE satisfies the stationary state and means for transmitting the position message over a sidelink in accordance with the configuration and based on identifying that the UE satisfies the set of conditions for the stationary state.

A non-transitory computer-readable medium storing code for wireless communications at a UE is described. The code may include instructions executable by a processor to identify that the UE satisfies a set of conditions for a stationary state, where the stationary state is associated with a configuration for transmitting a position message while the UE satisfies the stationary state and transmit the position message over a sidelink in accordance with the configuration and based on identifying that the UE satisfies the set of conditions for the stationary state.

Some examples of the method, apparatuses, and non-transitory computer-readable medium described herein may further include operations, features, means, or instructions for identifying a periodicity at which to transmit the position message based on the UE satisfying the set of conditions for the stationary state, where the UE transmits the position message in accordance with the periodicity.

In some examples of the method, apparatuses, and non-transitory computer-readable medium described herein, the periodicity at which to transmit the position message may be greater than a default periodicity associated with transmitting the position message while the UE may be in a non-stationary state.

In some examples of the method, apparatuses, and non-transitory computer-readable medium described herein, the position message includes a transmission state field in accordance with the configuration, the transmission state field indicating the stationary state of the UE.

In some examples of the method, apparatuses, and non-transitory computer-readable medium described herein, the position message includes a number of fields in accordance with the configuration and the number of fields included in the configuration may be less than a number of fields included in a non-stationary state configuration.

Some examples of the method, apparatuses, and non-transitory computer-readable medium described herein may further include operations, features, means, or instructions for identifying a periodicity at which to transmit the position message based on one or more environmental parameters of the UE.

In some examples of the method, apparatuses, and non-transitory computer-readable medium described herein, identifying the periodicity may include operations, features, means, or instructions for identifying that one or more additional UEs may be within a threshold proximity of the UE and may be in the stationary state and identifying an increased periodicity at which to transmit the position messages based on one or more additional UEs being within a threshold proximity of the UE and being in the stationary state.

In some examples of the method, apparatuses, and non-transitory computer-readable medium described herein, identifying the periodicity may include operations, features, means, or instructions for identifying that one or more additional UEs may be within a threshold proximity of the UE and may be in the stationary state and communicating with one or more additional UEs to identify a second configuration and a second periodicity for transmitting a second position message.

In some examples of the method, apparatuses, and non-transitory computer-readable medium described herein, transmitting the position message may include operations, features, means, or instructions for transmitting the position message in accordance with a first periodicity and transmitting the second position message in accordance with the second periodicity based on the communicating.

In some examples of the method, apparatuses, and non-transitory computer-readable medium described herein, the one or more environmental parameters include a location of the UE, a time of day, a density of neighboring UEs, a type of weather, or a combination thereof.

In some examples of the method, apparatuses, and non-transitory computer-readable medium described herein, the location of the UE includes a home garage, a parking lot, next to a bike lane, next to a curb, in a road, or a combination thereof.

In some examples of the method, apparatuses, and non-transitory computer-readable medium described herein, the UE identifies a first periodicity when the UE may be located in the home garage or the parking lot, and identifies a second periodicity when the UE may be located next to the bike lane, next to the curb, or in the road and the first periodicity may be greater than the second periodicity.

Some examples of the method, apparatuses, and non-transitory computer-readable medium described herein may further include operations, features, means, or instructions for identifying the one or more environmental parameters using a set of sensors on the UE, the set of sensors including a gyroscope, at least one inertial measurement unit, at least one camera, a lidar sensor, a radar sensor, or a combination thereof.

Some examples of the method, apparatuses, and non-transitory computer-readable medium described herein may further include operations, features, means, or instructions for identifying one or more parameters associated with an on-coming UE and selecting a periodicity at which to transmit the position message based on the one or more parameters of the on-coming UE.

Some examples of the method, apparatuses, and non-transitory computer-readable medium described herein may further include operations, features, means, or instructions for determining a distance between the UE and the on-coming UE based on the one or more parameters, where selecting the periodicity may be based on a comparison of the distance to a threshold.

In some examples of the method, apparatuses, and non-transitory computer-readable medium described herein, the UE selects a first periodicity when the distance may be less than the threshold and selects a second periodicity when the distance may be greater than the threshold, the first periodicity less than the second periodicity.

In some examples of the method, apparatuses, and non-transitory computer-readable medium described herein, identifying the one or more parameters may include operations, features, means, or instructions for identifying a heading of the on-coming UE, a speed of the on-coming UE, a location of the on-coming UE, or a combination thereof.

In some examples of the method, apparatuses, and non-transitory computer-readable medium described herein, the UE includes a vehicle UE, and the set of conditions for the stationary state includes the vehicle UE being parked and an engine of the vehicle UE being turned on.

In some examples of the method, apparatuses, and non-transitory computer-readable medium described herein, the UE includes a vehicle UE, and the set of conditions for the stationary state includes the vehicle UE being parked and an engine of the vehicle UE being turned off.

In some examples of the method, apparatuses, and non-transitory computer-readable medium described herein, the UE may be a transmitter fixed to a location.

DETAILED DESCRIPTION

Figure 1:
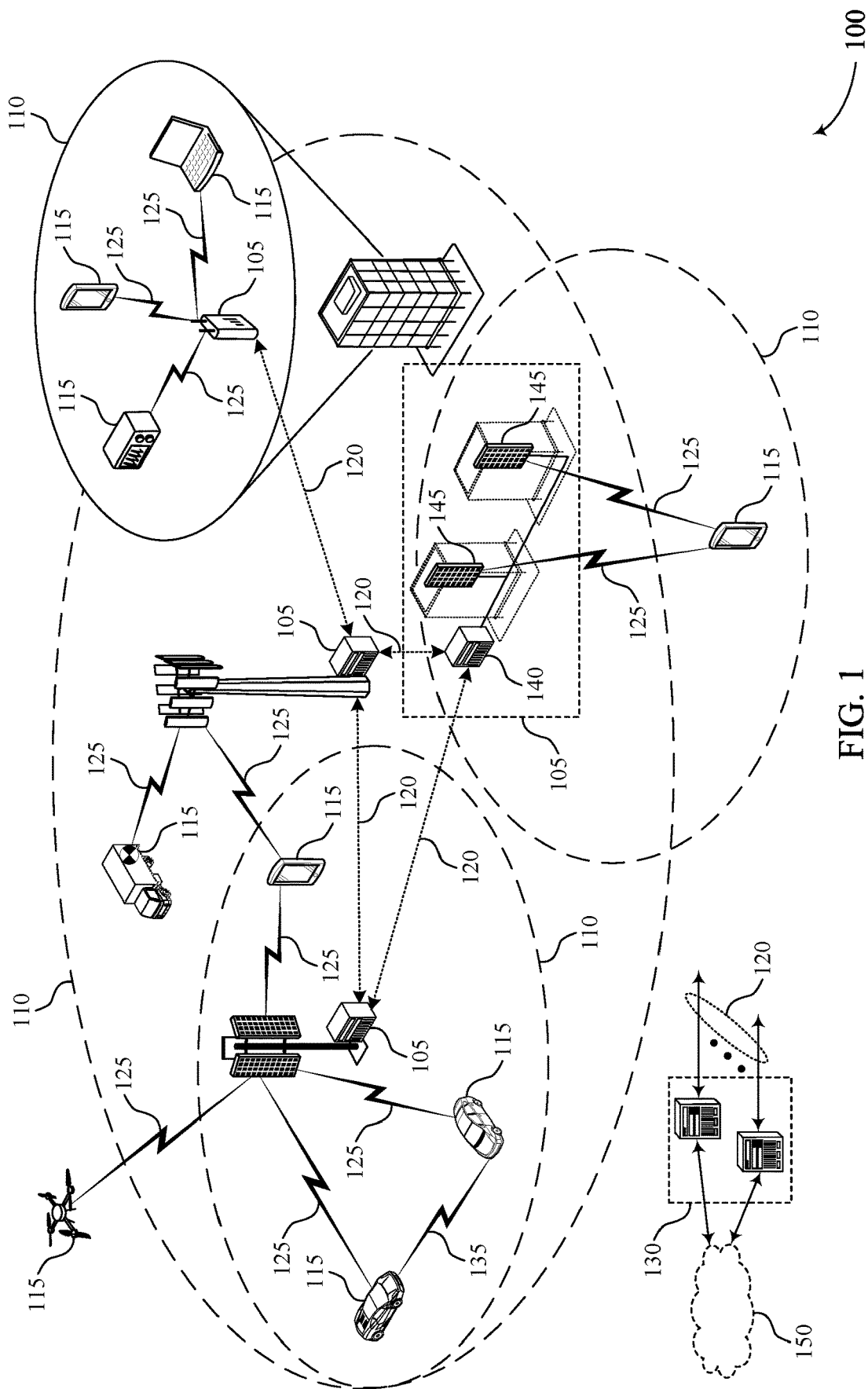
FIG. 1 illustrates an example of a wireless communications system that supports techniques for configuring transmission of a position message in accordance with aspects of the present disclosure.

In some wireless communications systems, a user equipment (UE) (e.g., a device such as a vehicle, or low-power sensor) may be configured to broadcast a basic safety message (BSM) at a certain periodicity. The BSM may include information such as the UE's location, speed, heading, etc. Accordingly, the BSM may alert one or more nearby UEs of the presence and parameters of the transmitting UE. Accordingly, a nearby UE may receive the BSM and determine whether to adjust parameters of the nearby UE, such as to avoid a collision with the transmitting UE.

In some cases, the UE may be configured to broadcast the BSM while the UE is in an 'ON' mode (e.g., components of the UE are turned on, such as an engine of a vehicle), but may not be configured to broadcast any BSM while the UE is in an 'OFF' mode (e.g., while one or more components of the UE are turned off, while the UE is stationary, or both). However, collisions may, in some cases, include stationary objects, such as a UE in an 'OFF' mode. Though, if a UE were configured to broadcast BSMs while in an OFF mode in accordance with the same configuration as when in an ON mode, the UE may transmit more information, at a lower periodicity (e.g., higher frequency), or both, than is necessary, leading to an unnecessary increase in signaling payload and battery consumption of the UE.

To reduce the payload of a transmitting UE while increasing safety measures, the configuration of the BSM message may change based on the conditions of a transmitting UE. In some cases, a transmitting UE may transmit a consistent BSM (e.g., that includes the same fields) despite the mode of the transmitting device, but the BSM message may be interpreted differently by receiving devices based on a mode of the transmitting UE. For example, the BSM message may include a transmission state field, where the transmitting UE may indicate that it is "parked (switched on)", or "parked (switched off)", or "Stationary", for example. In such cases, a receiving device may refrain from acknowledging one or more other motion-related fields in the BSM message such as "Speed", "Heading", "Angle", etc. In some cases, a transmitting UE in a parked, stationary, and/or OFF state may be configured to transmit a BSM message (e.g., a trimmed BSM message) that does not include fields that are not relevant to a parked, stationary, and/or OFF device (e.g., motion-related fields such as "Speed", "Heading", "Angle"). In some implementations, the transmitting UE may be configured to transmit the BSM message at an increased periodicity (e.g., reduced frequency) compared to when the transmitting UE is in an ON or moving state, so that the transmitting device transmits the BSM less often. In some cases, a transmitting UE may adjust the transmission periodicity of the BSM message based on environmental context (e.g., location the device is parked, time of day, weather, a number of surrounding vehicles).

Particular aspects of the subject matter described herein may be implemented to realize one or more advantages. The described techniques may support improvements in safety procedures by improving flexibility of safety message configurations, among other advantages. The described techniques may improve transmission of position messages, such as BSMs, by allowing the configuration of a BSM transmission to change based on one or more parameters associated with a transmitting device (e.g., OFF, parked, location, time of day). As such, supported techniques may include improved network operations and, in some examples, may promote network efficiencies, among other benefits.

Aspects of the disclosure are initially described in the context of wireless communications systems. Aspects are then described with reference to a process flow. Aspects of the disclosure are further illustrated by and described with reference to apparatus diagrams, system diagrams, and flowcharts that relate to techniques for configuring transmission of a position message.

FIG. 1 illustrates an example of a wireless communications system 100 that supports techniques for configuring transmission of a position message in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communication systems, such as wireless communications system 100, a UE 115 (e.g., a vehicle, low-power sensor) may be configured to transmit (e.g., broadcast) position messages (e.g., BSM messages) so as to alert nearby UEs 115 of the presence and/or parameters of the transmitting UE 115. In some cases, the transmitting UE 115 may identify that the transmitting UE 115 satisfies a set of conditions for a stationary state. The stationary state may be associated with a configuration for transmitting a position message while the transmitting UE 115 satisfies the stationary state. In some cases, the transmitting UE 115 may identify a periodicity at which to transmit the position message based on the transmitting UE 115 satisfying the set of conditions for the stationary state, where the periodicity associated with a stationary state may be larger than a periodicity associated with a non-stationary state. The transmitting UE 115 may transmit the position message over a sidelink in accordance with the configuration and based on identifying that the transmitting UE 115 satisfies the set of conditions for the stationary state. In some cases, the configuration for transmitting the position message may be based on satisfying a stationary state, a location of the transmitting UE 115, parameters associated with nearby UEs 115, etc.

Figure 2:
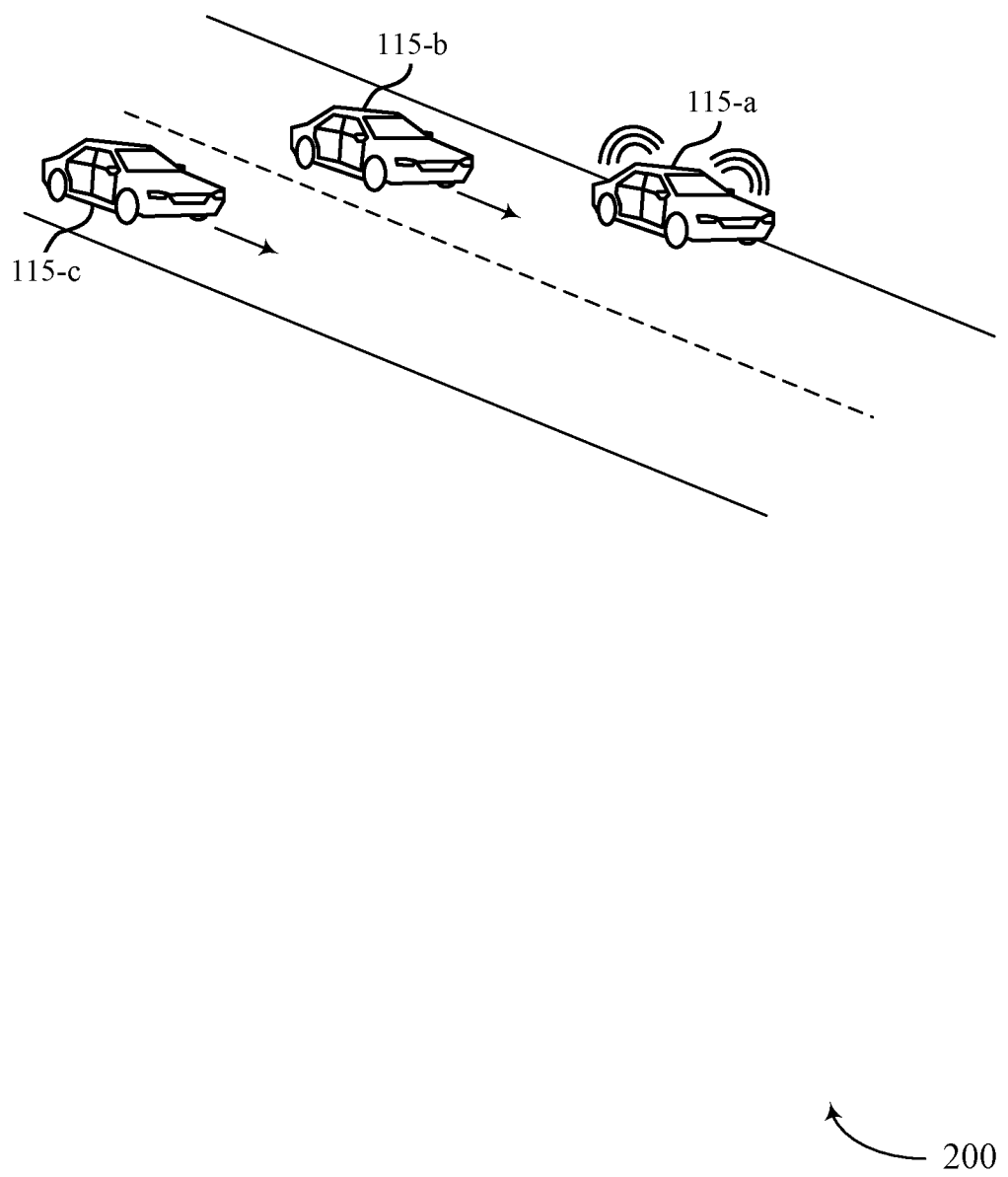
FIGS. 2 and 3 illustrate examples of wireless communications systems that support techniques for configuring transmission of a position message in accordance with aspects of the present disclosure.

FIG. 2 illustrates an example of a wireless communications system 200 that supports techniques for configuring transmission of a position message in accordance with aspects of the present disclosure. The wireless communications system 200 may include UEs 115-a, 115-b, and 115-c, which may be examples of UEs 115 as described with reference to FIG. 1. In some cases, UE 115-a may implement a safety procedure in which UE 115-a transmits one or more safety messages (e.g., position messages, BSMs), which may be received by UE 115-b, UE 115-c, or both. Additionally or alternatively, other wireless devices, such as a base station, or a network node, may implement a same or similar procedure as described herein.

In some wireless communications systems, such as a system including one or more UEs 115 that communicate over sidelinks (e.g., a V2X system), UEs 115 may be configured to transmit safety messages (e.g., position message, BSM) that indicate one or more parameters associated with the transmitting UE 115 (e.g., location, speed, heading, etc.). For example, a vehicle UE 115 may be configured to broadcast a BSM in accordance with a periodicity (e.g., a default periodicity or frequency) so as to alert one or more neighboring UEs 115 (e.g., nearby UEs 115, on-coming UEs 115) of the presence of the vehicle UE 115, where the neighboring UEs 115 may be other vehicle UEs 115, pedestrian UEs 115, bicycle UEs 115, etc. Accordingly, a neighboring UE 115 may receive one or more BSMs from the transmitting UE 115 and determine whether to adjust parameters of the neighboring UE 115, such as to avoid a collision with the transmitting UE 115.

In some cases, a transmitting UE 115 may be configured to indicate a message count (e.g., MsgCount), an identifier (e.g., TemporaryID), time information (e.g., DSecond), a latitude, longitude, elevation, positional accuracy, speed, heading, angle (e.g., SteeringWheelAngle), acceleration (e.g., AccelerationSet4Way), a brakes status (e.g., BrakeSystem Status), and a size of the vehicle (e.g., VehicleSize) in safety message (e.g., BSM).

In some cases, a UE 115 may be configured to broadcast the BSM while the UE 115 is in an 'ON' mode, but may not be configured to broadcast any BSM while the vehicle is in an 'OFF' mode, where OFF may refer to one or more components of the UE 115 being turned off, such as an engine of a vehicle, or may refer to the UE 115 being in a stationary mode (e.g., parked, not parked but not moving), or a combination thereof. However, collisions may, in some cases, include stationary objects, such as a UE 115 in an 'OFF' mode. For example, UE 115-a may be in an OFF mode, such that UE 115-a is parked, the engine of UE 115-a is turned off, or both. Accordingly, UE 115-a may be configured to refrain from transmitting a BSM. However, UE 115-b (e.g., another vehicle, a bicycle, some other fast moving device) may fail to acknowledge that UE 115-a is parked and may collide with UE 115-a. In another example, UE 115-b may in fact realize that UE 115-a is parked and may veer to the right to avoid a collision with UE 115-a. However, as UE 115-c may be following close behind UE 115-b, if UE 115-b veers to the right then UE 115-b may instead collide with UE 115-c.

Accordingly, some systems may benefit from configuring devices to transmit BSMs while in an OFF mode. Though, if a UE 115 were configured to broadcast BSMs while in an OFF mode in accordance with the same configuration as when in an ON mode, the UE 115 may transmit more information, at a lower periodicity, or both, than is necessary, leading to an unnecessary increase in signaling payload and battery consumption of the UE 115.

To reduce the payload of a transmitting UE 115 while increasing safety measures, the configuration (e.g., fields included in the BSM, periodicity) of the BSM message may change based on the conditions of a transmitting UE 115 (e.g., vehicle, a fixed object) and in some cases, the UE 115 may be configured to transmit a BSM while in an OFF mode. Accordingly, a transmitting UE 115 may identify one or more parameters associated with the transmitting UE 115 and determine a configuration for transmitting the BSM message based on the one or more parameters.

For example, UE 115-a may be a vehicle UE 115 and may identify that it satisfies one or more conditions associated with an OFF mode, such as UE 115-a is in a parked position and/or the engine of UE 115-a is turned off. Based on UE 115-a being in an OFF mode, UE 115-a may determine a configuration for transmitting a BSM message. In some cases, UE 115-a may determine that the BSM message includes a fewer number of fields than a BSM message associated with an ON mode. For example, UE 115-a may determine to transmit a BSM message (e.g., a trimmed BSM message) that does not include fields that are not relevant to a parked and/or OFF device (e.g., motion-related fields such as Speed, Heading, Angle). Accordingly, the trimmed BSM message may indicate a message count (e.g., MsgCount), an identifier (e.g., TemporaryID), time information (e.g., DSecond), a latitude, longitude, elevation, positional accuracy, and a size of the vehicle (e.g., VehicleSize). In some cases, the trimmed BSM may include a transmission state field. For example, the transmissions state field may indicate the UE 115-a is "parked (switched on)" (e.g., UE 115-a is parked while the engine of UE 115-a is on), or "parked (switched off)" (e.g., UE 115-a is parked and the engine of UE 115-a is off), or "stationary (switched on)" (e.g., UE 115-*a* is not moving but is also not parked), for example. In such cases, a receiving UE 115 may identify the format of the BSM based on the transmission state field indicating that UE 115-*a* is in a parked (or OFF mode). For example, the receiving UE 115 may identify that the BSM is a trimmed BSM.

In some cases, the trimmed BSM may not include a transmission state field. Accordingly, a receiving UE 115 may determine that UE 115-*a* is in an OFF mode based on the BSM message being trimmed. For example, UE 115-*b* may receive the trimmed BSM from UE 115-*a* and determine that UE 115-*a* is not moving (e.g., parked) based on the BSM being trimmed.

In some implementations, UE 115-*a* may be configured to transmit a BSM that includes the same fields despite the mode of UE 115-*a*, but the BSM message may be interpreted differently by receiving devices (e.g., UE 115-*b*, UE 115-*c*) based on the mode of the UE 115-*a*. For example, the BSM message may include a transmission state field. In such cases, a UE 115 that receives the BSM, such as UE 115-*b*, may refrain from acknowledging one or more other motion-related fields in the BSM message such as Speed, Heading, Angle, etc. based on UE 115-*a* being in a parked and/or off state (as indicated by the transmission state field).

In some implementations, a transmitting UE 115 in an OFF mode (e.g., stationary, parked, the engine is off, or a combination thereof) may be configured to transmit the BSM message with an increased periodicity (e.g., a reduced frequency) compared to when the transmitting UE 115 is in an ON or in moving state, so that the transmitting UE 115 transmits the BSM less often. In some cases, a transmitting UE 115 may adjust the transmission periodicity of the BSM message based on context (e.g., environmental context) such as a location in which the UE 115 is parked, time of day, weather, a number of surrounding UEs 115, proximity of surrounding UEs 115, speed of surrounding UEs 115, etc. Accordingly, context may refer to a parameter associated with a probability that a stationary UE 115 induces a collision with other UEs 115. For example, being in an OFF mode during the daytime may result in the transmitting UE 115 transmitting the BSM at a lower periodicity compared to the nighttime. Similarly, the transmitting UE 115 may reduce the periodicity when surrounded by a greater number of cars, when the surrounding cars are approaching quickly, when the weather is extreme (e.g., raining, snowing, etc.), etc. In some cases, the transmitting UE 115 may determine a location the transmitting UE 115 is parked. For example, UE 115-*a* may determine that UE 115-*a* is parked on a street. In some cases, the transmitting UE 115 may determine to be parked in a parking lot, a public parking garage, a home garage, a driveway, in a rural area, in a urban area, in a residential area, curbside, in the middle of a street, on or near a bike lane, etc. and may adjust the periodicity of the BSM based on the determined location. For example, the transmitting UE 115 may transmit a BSM at a greater periodicity (or not at all) when parked in a home garage versus when parked on a street of an urban area.

In some cases, the transmitting UE 115 may compare a context parameter to one or more thresholds (e.g., a time of day threshold, number of surrounding UEs 115 threshold, speed of surrounding UEs 115 threshold, etc.) to determine when to increase or reduce periodicity. In some cases, a transmitting UE 115 may be configured to adjust BSM periodicity based on how quickly one or more other UEs 115 are expected to be within a certain proximity of the transmitting UE 115. Accordingly, the transmitting UE 115, such as UE 115-*a*, may determine the speed, heading, or both of UE 115-*b* such as based on a BSM transmitted by UE 115-*b*. In some cases, UE 115-*a* may determine such parameters of UE 115-*b* based on UE 115-*b* being within a threshold distance of UE 115-*a*. UE 115-*a* may be configured to reduce the periodicity of the BSM based on UE 115-*b* getting closer and closer to UE 115-*a*. For example, UE 115-*a* may transmit the BSM at a first periodicity if UE 115-*a* is within a threshold distance from UE 115-*a*. Otherwise, UE 115-*a* may transmit the BSM at a default frequency, where the default periodicity may be associated with the OFF mode (e.g., an OFF mode default periodicity). The first periodicity may be less than the default periodicity.

In some cases, UE 115-*a* may determine context based on one or more sensors on UE 115-*a*. For example, UE 115-*a* may include a GPS, one or more inherent sensors, or a combination thereof, such as one or more gyroscopes, one or more inertial measurement units (IMUs), one or more cameras, lidar, radar, etc. In some cases, as UE 115-*a* is coming to a stationary state (e.g., slowing down), or as UE 115-*a* enters a stationary state, UE 115-*a* may be configured to utilize the one or more sensors to detect one or more parameters associated with the environmental context, such as the location that UE 115-*a* is stationary, weather, etc.

In some implementations, a stationary UE 115 as described herein may be an example of a low-power sensor (e.g., a low-power transmitter). In some cases, the lower-power sensor may be fixed to a stationary object (e.g., a tree, pole, signpost, power pole, utility box, traffic pole, etc.). In some implementations, a low-power sensor may be fixed to an object associated with a higher probability of inducing collisions (e.g., on abject on a blind curve along a road, a temporary road work area causing accident prone zones). In some cases, the low-power sensor may be configured to perform procedures as described herein to transmit BSMs when the low-power sensor is associated with a higher probability of inducing collisions.

In one example, a low-power sensor may be attached to a fixed object, and may detect context (e.g., environment conditions such as rain, foggy, etc., time of the day, nearby vehicle density). The low-power sensor may adapt the BSM type, and BSM periodicity based on the determined context. For example, a low-power sensor may detect a density of nearby UEs 115 to be high (e.g., greater than a threshold) and may adapt the BSM type (e.g., whether or not the BSM indicates that the low-power sensor is a stationary object) and the BSM periodicity, so as to transmit the BSM more often (as compared to when the density of nearby UEs 115 is less). In some cases, such low-power sensors may not be configured to receive and in some cases may be powered by battery, solar panels, etc. In some cases, a low-power sensor may determine environmental context based on one or more sensors on the low-power sensor (e.g., a gyroscope, an IMU, a camera, a lidar sensor, a radar sensor, or a combination thereof). In some cases, a low-power sensor may receive, from a base station or UE 115, for example, an indication of environmental context.

Figure 3:
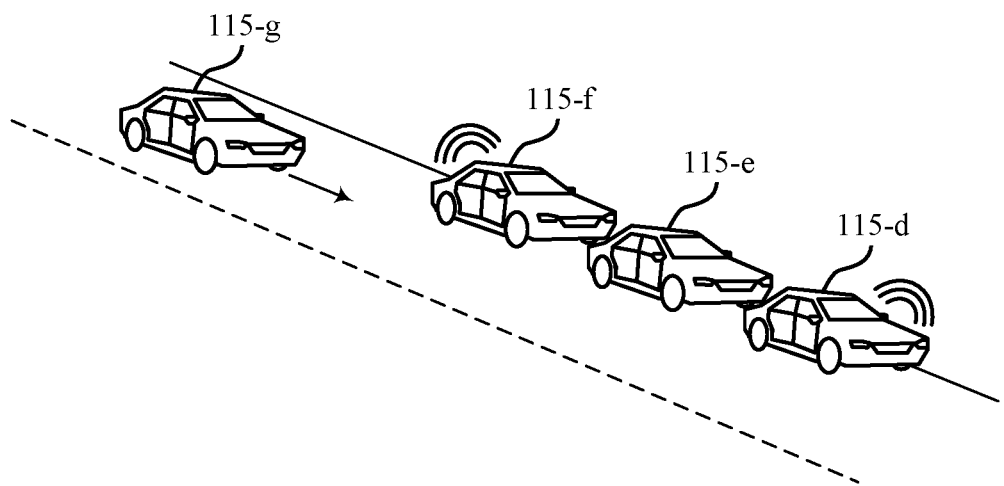

FIG. 3 illustrates an example of a wireless communications system 300 that supports techniques for configuring transmission of a position message in accordance with aspects of the present disclosure. The wireless communications system 300 may include UEs 115-*d*, 115-*e*, 115-*f*, and 115-*g*, which may be examples of UEs 115 as described with reference to FIGS. 1 and 2. In some cases, UEs 115-*d*, 115-*e*, 115-*f*, or a combination thereof, may implement a safety procedure in which one or more of UEs 115-*d*, 115-*e*, and 115-*f* may transmit a safety message (e.g., position messages, BSMs), which may be received by UEs 115-*d*, 115-*e*, 115-*f*, UE 115-*g*, or a combination thereof. Additionally or alternatively, other wireless devices, such as a base station, or network node, may implement a same or similar procedure as described herein.

In some implementations, a stationary UE 115 (e.g., a UE 115 in an OFF mode) may be configured to transmit BSMs based on other surrounding, stationary UEs 115. For example, UE 115-*d*, UE 115-*e*, and UE 115-*f* may each be parked along a curb, for example. In some cases, UE 115-*e* may identify that UE 115-*d* is stationary in front of UE 115-*e* and that UE 115-*f* is stationary behind UE 115-*e*. UE 115-*e* may identify such based on one or more sensors of UE 115-*e*, based on one or more BSMs from UE 115-*d* and/or UE 115-*f*, based on an indication from a base station, or a combination thereof. As UE 115-*e* is surrounded by other stationary UEs 115, it may be unlikely that another mobile UE 115 collides with UE 115-*e*, as compared to the likelihood of collision with UE 115-*d* or UE 115-*f*. Accordingly, UE 115-*e* may determine to increase the periodicity of the BSM UE 115-*e* is transmitting. For example, UE 115-*d* may transmit a BSM at a first periodicity and UE 115-*e* may transmit a BSM at a second periodicity, where the first periodicity may be less than the second periodicity. In some cases, UE 115-*e* may determine to refrain from transmitting a BSM when surrounded by other stationary UEs 115.

In some cases, UE 115-*e* may determine to increase the periodicity at which UE 115-*e* is transmitting the BSM based on the determination that UE 115-*d* and UE 115-*f* are both transmitting BSMs periodically. For example, if UE 115-*e* determines that UE 115-*d* is not transmitting a BSM periodically, then UE 115-*e* may determine not to increase the periodicity at which UE 115-*e* transmits a BSM so as to inform nearby, mobile UEs 115 of the presence of UE 115-*e*, UE 115-*d*, or both.

In some implementations, a group of stationary UEs 115 may cooperate with one another to determine a BSM configuration. For example, UEs 115-*d*, 115-*e*, and 115-*f* may communicate with one another to determine a BSM frequency for one or more of the UEs 115. In some cases, the UEs 115 may determine that each UE 115 is to increase periodicity as compared to a default frequency (e.g., a stationary default frequency), such as three times the default periodicity. For example, UEs 115-*d*, 115-*e*, and 115-*f* may each transmit a BSM at the same increased periodicity. In some cases, UE 115-*d*, 115-*e*, and 115-*f* may determine to transmit at different periodicities. In some cases, the UEs 115 may determine to transmit at periodicities and/or offsets so that each UE 115 is transmitting a BSM at a different time (e.g., in a round-robin scheme). For example, UE 115-*d* may transmit a BSM at a first time, UE 115-*e* may transmit a BSM at a second time, UE 115-*f* may transmit a BSM at a third time, and then UE 115-*d* may transmit a BSM at a fourth time, and so on. Accordingly, UE 115-*g* may receive a BSM from UE 115-*d*, UE 115-*e*, UE 115-*f*, or a combination thereof.

In some cases, a UE 115 may be configured with a set of periodicities (e.g., frequencies), where each periodicity in the set may be associated with a particular context (e.g., situation). Accordingly, upon determining that the UE 115 is in a particular context, the UE may determine the configured periodicity associated with the particular context. In some cases, a UE 115 may be configured with a trend of how to adjust periodicity based on particular contexts (e.g., increase periodicity as nighttime approaches, decrease periodicity as the number of surrounding vehicles increase, etc.). In some cases, a UE 115 may receive signaling (e.g., RRC, MAC-CE, DCI, SCI, UCI), such as from a base station 105 or other UE 115, to indicate a periodicity to use. In some cases, a UE 115 may autonomously determine a periodicity to use for a particular context (e.g., via situational learning).

Figure 4:
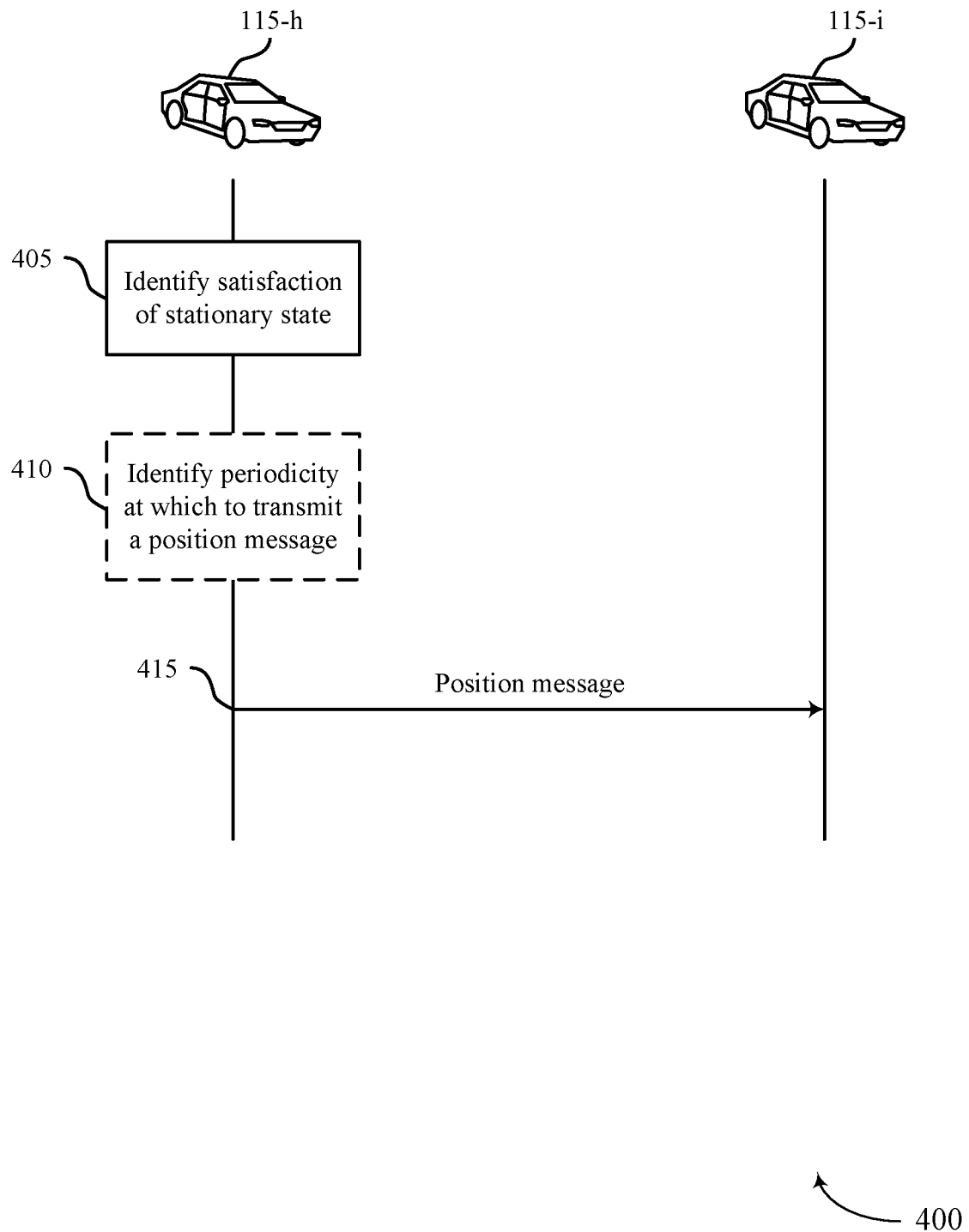
FIG. 4 illustrates an example of a process flow that supports techniques for configuring transmission of a position message in accordance with aspects of the present disclosure.

FIG. 4 illustrates an example of a process flow 400 that supports techniques for configuring transmission of a position message in accordance with aspects of the present disclosure. The process flow 400 may illustrate an example safety procedure in which UE 115-*h* may transmit one or more position messages based on one or more parameters associated with UE 115-*h*. In some cases, UE 115-*i* may receive the one or more position messages from UE 115-*h*. UE 115-*h* and UE 115-*i* may be examples of the corresponding wireless devices described with reference to FIGS. 1 through 3. For example, UEs 115-*h* and 115-*i* may be examples of vehicles, low-power transmitters, etc. In some cases, instead of UE 115-*h* implementing a position message transmission procedure, a different type of wireless device (e.g., a base station, a network node) may perform a same or similar procedure. Alternative examples of the following may be implemented, where some steps are performed in a different order than described or are not performed at all. In some cases, steps may include additional features not mentioned below, or further steps may be added.

At 405, UE 115-*h* may identify that UE 115-*h* satisfies a set of conditions for a stationary state, where the stationary state may be associated with a configuration for transmitting a position message while UE 115-*h* satisfies the stationary state.

In some implementations, UE 115-*h* may be a vehicle UE 115, and the set of conditions for the stationary state may include the vehicle UE 115 being parked and an engine of the vehicle UE 115 being turned on. In some implementations, UE 115-*h* may be a vehicle UE 115, and the set of conditions for the stationary state may include the vehicle UE 115 being parked and an engine of the vehicle UE 115 being turned off. In some cases, UE 115-*h* may be a transmitter fixed to a location.

In some cases, at 410, UE 115-*h* may identify a periodicity at which to transmit the position message based at least in part on UE 115-*h* satisfying the set of conditions for the stationary state. The periodicity at which to transmit the position message may be greater than a default periodicity associated with transmitting the position message while UE 115-*h* is in a non-stationary state.

In some cases, UE 115-*h* may identify a periodicity at which to transmit the position message based at least in part on one or more environmental parameters of UE 115-*h*. Identifying the periodicity may include identifying that one or more additional UEs 115 (e.g., UE 115-*i*) are within a threshold proximity of UE 115-*h* and are in the stationary state, and identifying an increased periodicity at which to transmit the position messages based at least in part on one or more additional UEs 115 being within a threshold proximity of UE 115-*h* and being in the stationary state. In some cases, identifying the periodicity may include identifying that one or more additional UEs 115 are within a threshold proximity of UE 115-*h* and are in the stationary state, and communicating with one or more additional UEs 115 to identify a second configuration and a second periodicity for transmitting a second position message. The one or more environmental parameters comprise a location of UE 115-*h*, a time of day, a density of neighboring UEs 115, a type of weather, or a combination thereof. The location of UE 115-*h* may include a home garage, a parking lot, next to a bike lane, next to a curb, in a road, or a combination thereof. UE 115-*h* may identify a first periodicity when UE 115-*h* is located in the home garage or the parking lot, and identifies a second periodicity when UE 115-*h* is located next to the bike lane, next to the curb, or in the road. The first periodicity may be greater than the second periodicity.

In some cases, UE 115-*h* may identify the one or more environmental parameters using a set of sensors on UE 115-*h*. For example, the set of sensors may include a gyroscope, at least one inertial measurement unit, at least one camera, a lidar sensor, a radar sensor, or a combination thereof. In some implementations, UE 115-*h* may identify one or more parameters associated with an on-coming UE 115 (e.g., UE 115-*i*), and may select a periodicity at which to transmit the position message based at least in part on the one or more parameters of the on-coming UE 115. UE 115-*h* may determine a distance between UE 115-*h* and the on-coming UE 115 based at least in part on the one or more parameters, where selecting the periodicity is based at least in part on a comparison of the distance to a threshold (e.g., a preconfigured threshold). UE 115-*h* may select a first periodicity when the distance is less than the threshold and selects a second periodicity when the distance is greater than the threshold, the first periodicity less than the second periodicity. Identifying the one or more parameters may include identifying a heading of the on-coming UE 115, a speed of the on-coming UE 115, a location of the on-coming UE 115, or a combination thereof.

At 415, UE 115-*h* may transmit the position message over a sidelink in accordance with the configuration and based at least in part on identifying that UE 115-*h* satisfies the set of conditions for the stationary state. UE 115-*h* may transmits the position message in accordance with the identified periodicity.

The position message may include a transmission state field in accordance with the configuration, the transmission state field may indicate the stationary state of UE 115-*h*. In some cases, the position message may include a number of fields in accordance with the configuration, wherein the number of fields included in the configuration may be less than a number of fields included in a non-stationary state configuration.

Transmitting the position message may include transmitting the position message in accordance with a first periodicity, transmitting the second position message in accordance with the second periodicity based at least in part on communicating with one or more additional UEs 115.

Figure 5:
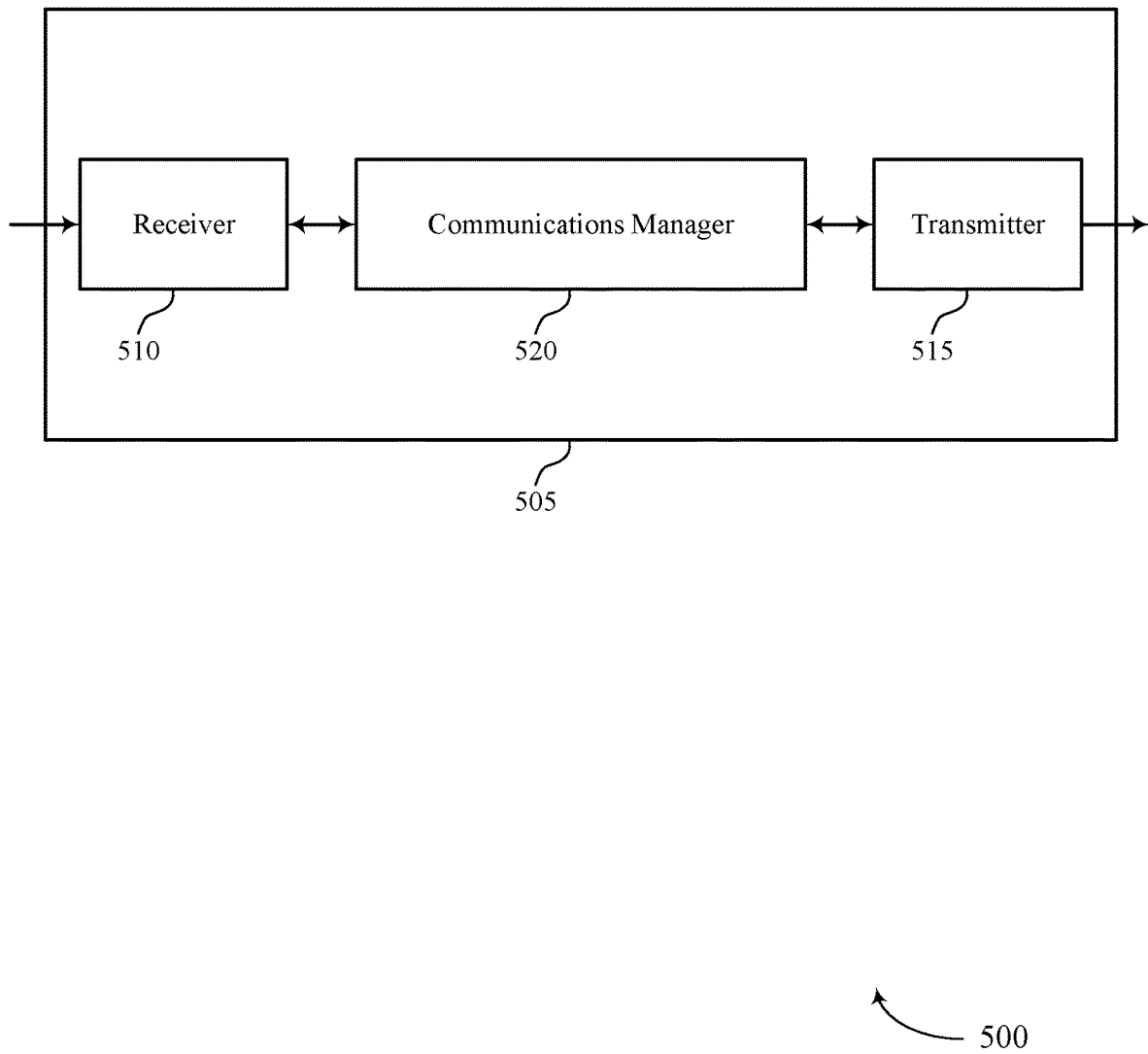
FIGS. 5 and 6 show block diagrams of devices that support techniques for configuring transmission of a position message in accordance with aspects of the present disclosure.

FIG. 5 shows a block diagram 500 of a device 505 that supports techniques for configuring transmission of a position message in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for configuring transmission of a position message). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for configuring transmission of a position message). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for configuring transmission of a position message as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for identifying that the UE satisfies a set of conditions for a stationary state, where the stationary state is associated with a configuration for transmitting a position message while the UE satisfies the stationary state. The communications manager 520 may be configured as or otherwise support a means for transmitting the position message over a sidelink in accordance with the configuration and based on identifying that the UE satisfies the set of conditions for the stationary state.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources, among other advantages.

Figure 6:
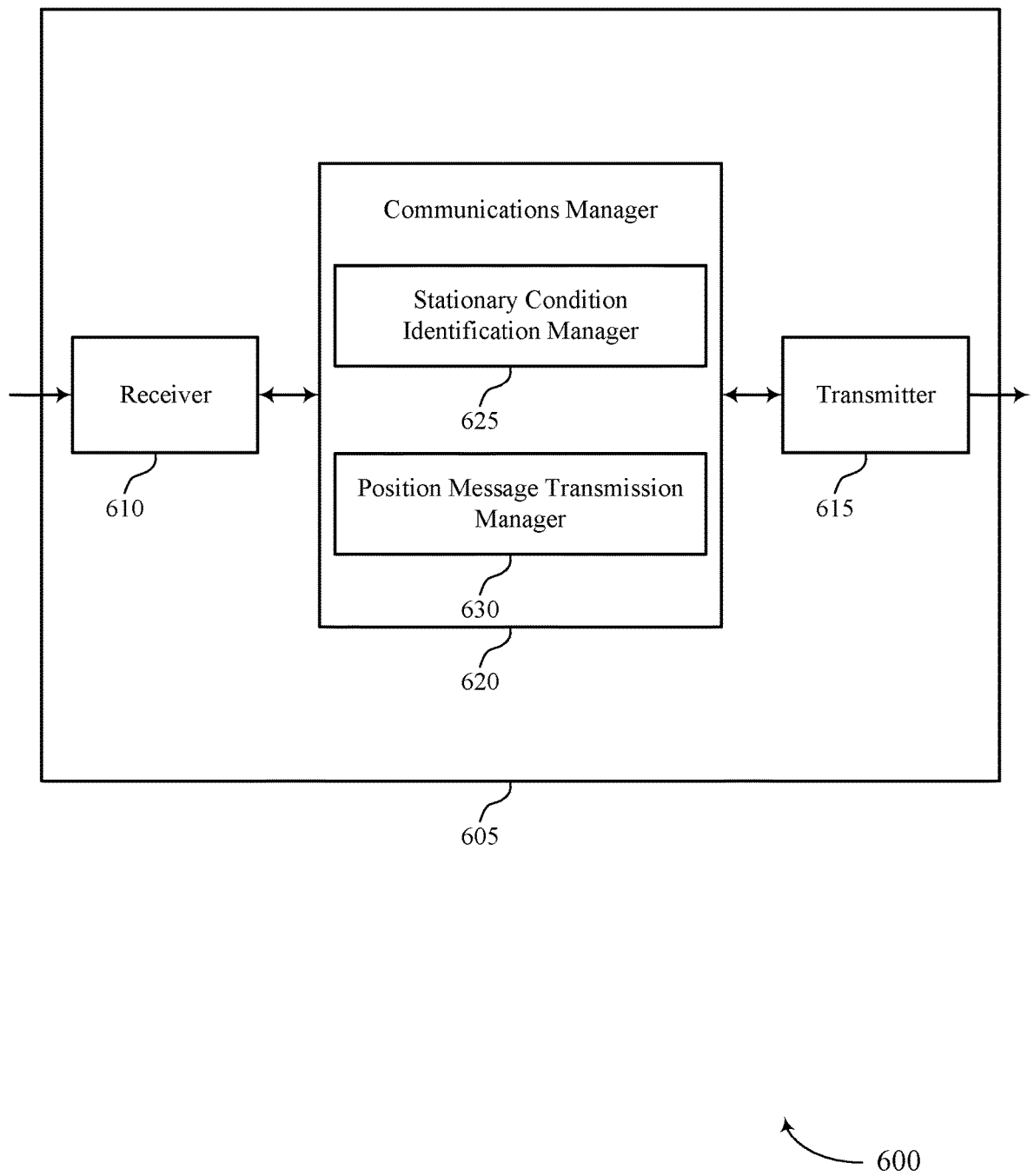

FIG. 6 shows a block diagram 600 of a device 605 that supports techniques for configuring transmission of a position message in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring transmission of a position message). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring transmission of a position message). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for configuring transmission of a position message as described herein. For example, the communications manager 620 may include a stationary condition identification manager 625 a position message transmission manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The stationary condition identification manager 625 may be configured as or otherwise support a means for identifying that the UE satisfies a set of conditions for a stationary state, where the stationary state is associated with a configuration for transmitting a position message while the UE satisfies the stationary state. The position message transmission manager 630 may be configured as or otherwise support a means for transmitting the position message over a sidelink in accordance with the configuration and based on identifying that the UE satisfies the set of conditions for the stationary state.

Figure 7:
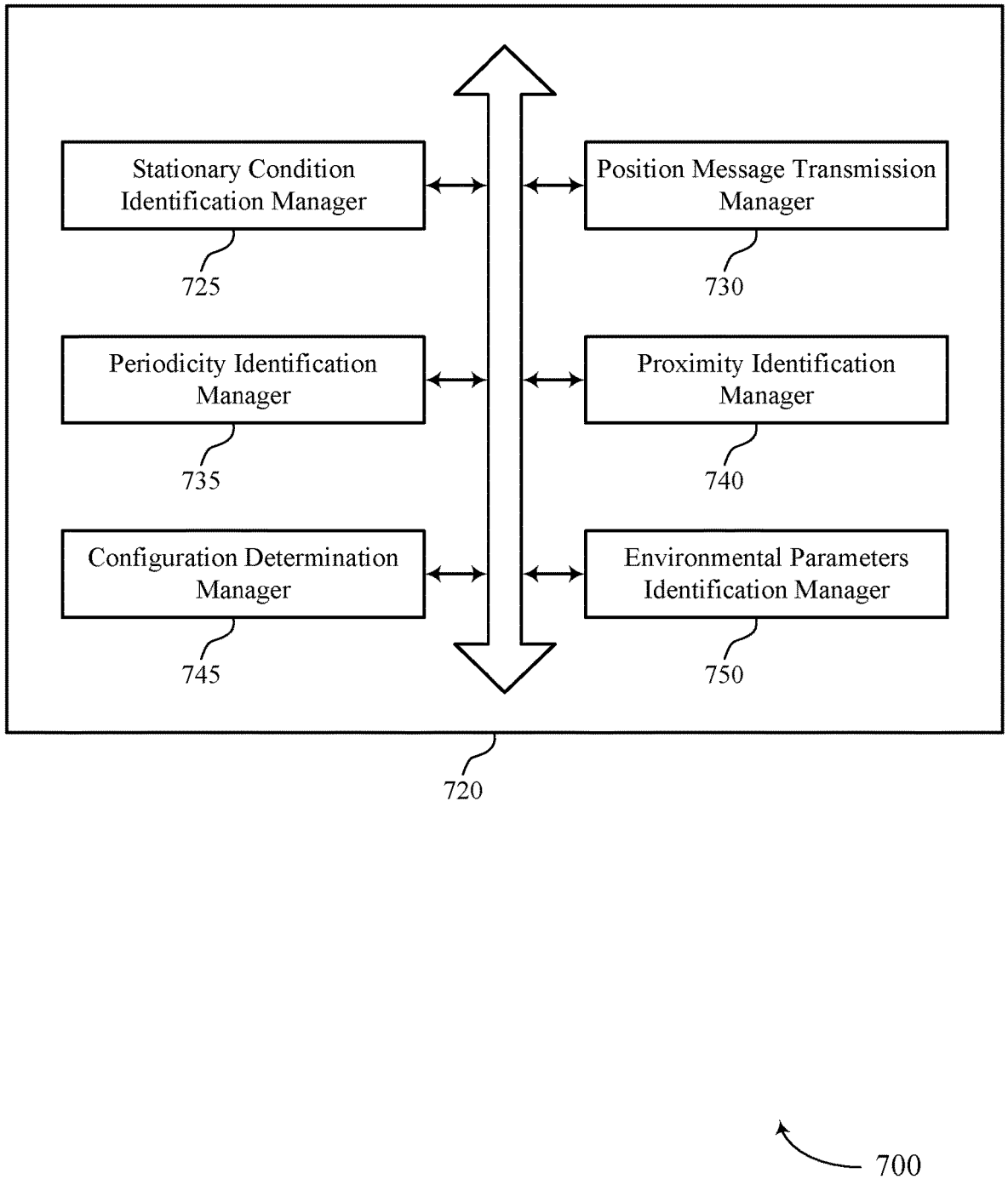
FIG. 7 shows a block diagram of a communications manager that supports techniques for configuring transmission of a position message in accordance with aspects of the present disclosure.

FIG. 7 shows a block diagram 700 of a communications manager 720 that supports techniques for configuring transmission of a position message in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for configuring transmission of a position message as described herein. For example, the communications manager 720 may include a stationary condition identification manager 725, a position message transmission manager 730, a periodicity identification manager 735, a proximity identification manager 740, a configuration determination manager 745, an environmental parameters identification manager 750, or any combination thereof. Each of these components may communicate, directly or indirectly, with one another (e.g., via one or more buses).

The communications manager 720 may support wireless communications at a UE in accordance with examples as disclosed herein. The stationary condition identification manager 725 may be configured as or otherwise support a means for identifying that the UE satisfies a set of conditions for a stationary state, where the stationary state is associated with a configuration for transmitting a position message while the UE satisfies the stationary state. The position message transmission manager 730 may be configured as or otherwise support a means for transmitting the position message over a sidelink in accordance with the configuration and based on identifying that the UE satisfies the set of conditions for the stationary state.

In some examples, the periodicity identification manager 735 may be configured as or otherwise support a means for identifying a periodicity at which to transmit the position message based on the UE satisfying the set of conditions for the stationary state, where the UE transmits the position message in accordance with the periodicity.

In some examples, the periodicity at which to transmit the position message is greater than a default periodicity associated with transmitting the position message while the UE is in a non-stationary state.

In some examples, the position message includes a transmission state field in accordance with the configuration, the transmission state field indicating the stationary state of the UE.

In some examples, the position message includes a number of fields in accordance with the configuration. In some examples, the number of fields included in the configuration is less than a number of fields included in a non-stationary state configuration.

In some examples, the periodicity identification manager 735 may be configured as or otherwise support a means for identifying a periodicity at which to transmit the position message based on one or more environmental parameters of the UE.

In some examples, to support identifying the periodicity, the proximity identification manager 740 may be configured as or otherwise support a means for identifying that one or more additional UEs are within a threshold proximity of the UE and are in the stationary state. In some examples, to support identifying the periodicity, the periodicity identification manager 735 may be configured as or otherwise support a means for identifying an increased periodicity at which to transmit the position messages based on one or more additional UEs being within a threshold proximity of the UE and being in the stationary state.

In some examples, to support identifying the periodicity, the proximity identification manager 740 may be configured as or otherwise support a means for identifying that one or more additional UEs are within a threshold proximity of the UE and are in the stationary state. In some examples, to support identifying the periodicity, the configuration determination manager 745 may be configured as or otherwise support a means for communicating with one or more additional UEs to identify a second configuration and a second periodicity for transmitting a second position message.

In some examples, to support transmitting the position message, the position message transmission manager 730 may be configured as or otherwise support a means for transmitting the position message in accordance with a first periodicity. In some examples, to support transmitting the position message, the position message transmission manager 730 may be configured as or otherwise support a means for transmitting the second position message in accordance with the second periodicity based on the communicating.

In some examples, the one or more environmental parameters include a location of the UE, a time of day, a density of neighboring UEs, a type of weather, or a combination thereof.

In some examples, the location of the UE includes a home garage, a parking lot, next to a bike lane, next to a curb, in a road, or a combination thereof.

In some examples, the UE identifies a first periodicity when the UE is located in the home garage or the parking lot, and identifies a second periodicity when the UE is located next to the bike lane, next to the curb, or in the road. In some examples, the first periodicity is greater than the second periodicity.

In some examples, the environmental parameters identification manager 750 may be configured as or otherwise support a means for identifying the one or more environmental parameters using a set of sensors on the UE, the set of sensors including a gyroscope, at least one inertial measurement unit, at least one camera, a lidar sensor, a radar sensor, or a combination thereof.

In some examples, the proximity identification manager 740 may be configured as or otherwise support a means for identifying one or more parameters associated with an on-coming UE. In some examples, the periodicity identification manager 735 may be configured as or otherwise support a means for selecting a periodicity at which to transmit the position message based on the one or more parameters of the on-coming UE.

In some examples, the proximity identification manager 740 may be configured as or otherwise support a means for determining a distance between the UE and the on-coming UE based on the one or more parameters, where selecting the periodicity is based on a comparison of the distance to a threshold.

In some examples, the UE selects a first periodicity when the distance is less than the threshold and selects a second periodicity when the distance is greater than the threshold, the first periodicity less than the second periodicity.

In some examples, to support identifying the one or more parameters, the proximity identification manager 740 may be configured as or otherwise support a means for identifying a heading of the on-coming UE, a speed of the on-coming UE, a location of the on-coming UE, or a combination thereof.

In some examples, the UE includes a vehicle UE, and the set of conditions for the stationary state includes the vehicle UE being parked and an engine of the vehicle UE being turned on.

In some examples, the UE includes a vehicle UE, and the set of conditions for the stationary state includes the vehicle UE being parked and an engine of the vehicle UE being turned off.

In some examples, the UE is a transmitter fixed to a location.

Figure 8:
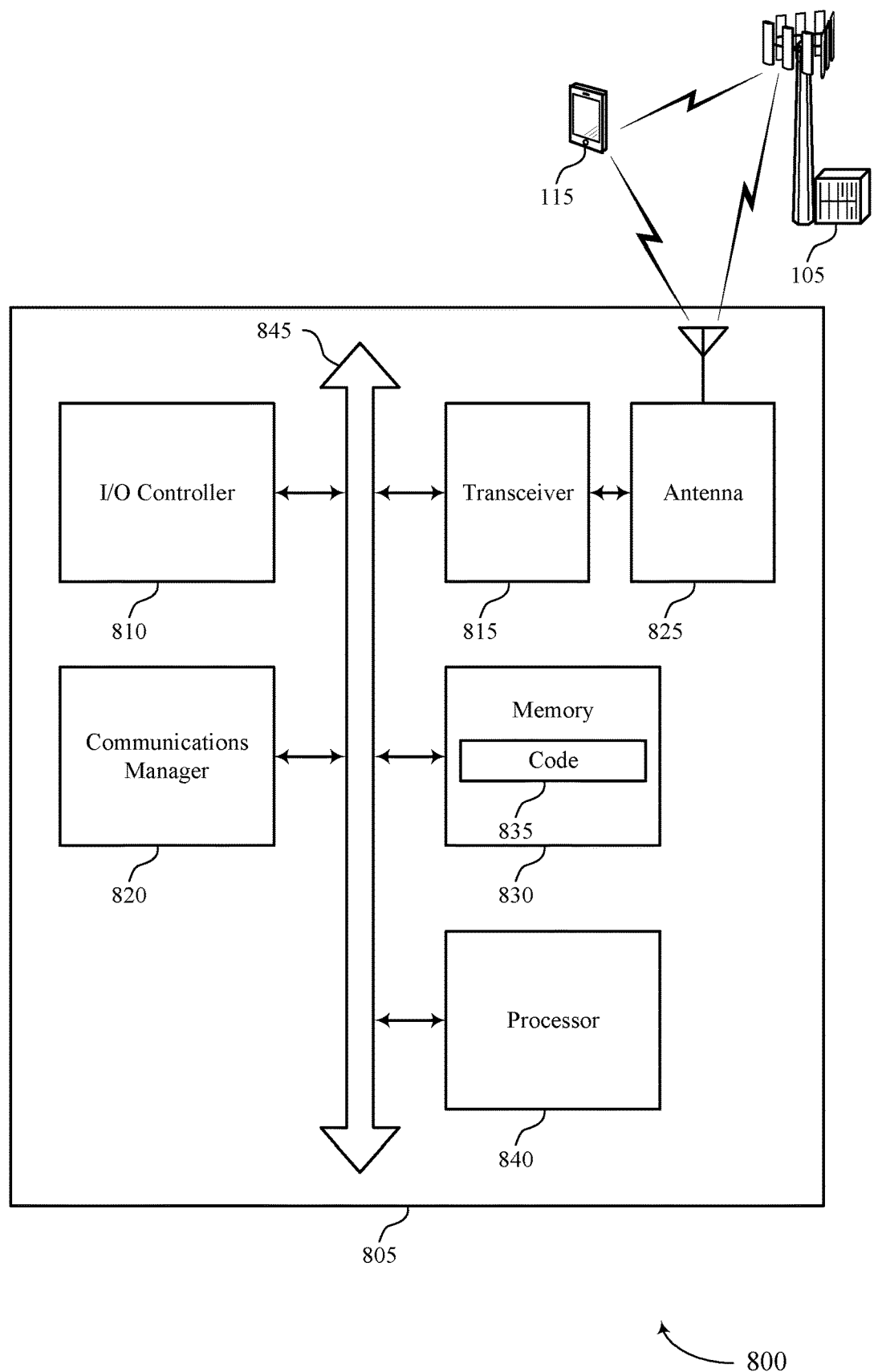
FIG. 8 shows a diagram of a system including a device that supports techniques for configuring transmission of a position message in accordance with aspects of the present disclosure.

FIG. 8 shows a diagram of a system 800 including a device 805 that supports techniques for configuring transmission of a position message in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for configuring transmission of a position message). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for identifying that the UE satisfies a set of conditions for a stationary state, where the stationary state is associated with a configuration for transmitting a position message while the UE satisfies the stationary state. The communications manager 820 may be configured as or otherwise support a means for transmitting the position message over a sidelink in accordance with the configuration and based on identifying that the UE satisfies the set of conditions for the stationary state.

By including or configuring the communications manager 820 in accordance with examples as described herein, the device 805 may support techniques for improved communication reliability, reduced latency, reduced power consumption, more efficient utilization of communication resources, improved coordination between devices, longer battery life, and increased safety, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for configuring transmission of a position message as described herein, or the processor 840 and the memory 830 may be otherwise configured to perform or support such operations.

Figure 9:
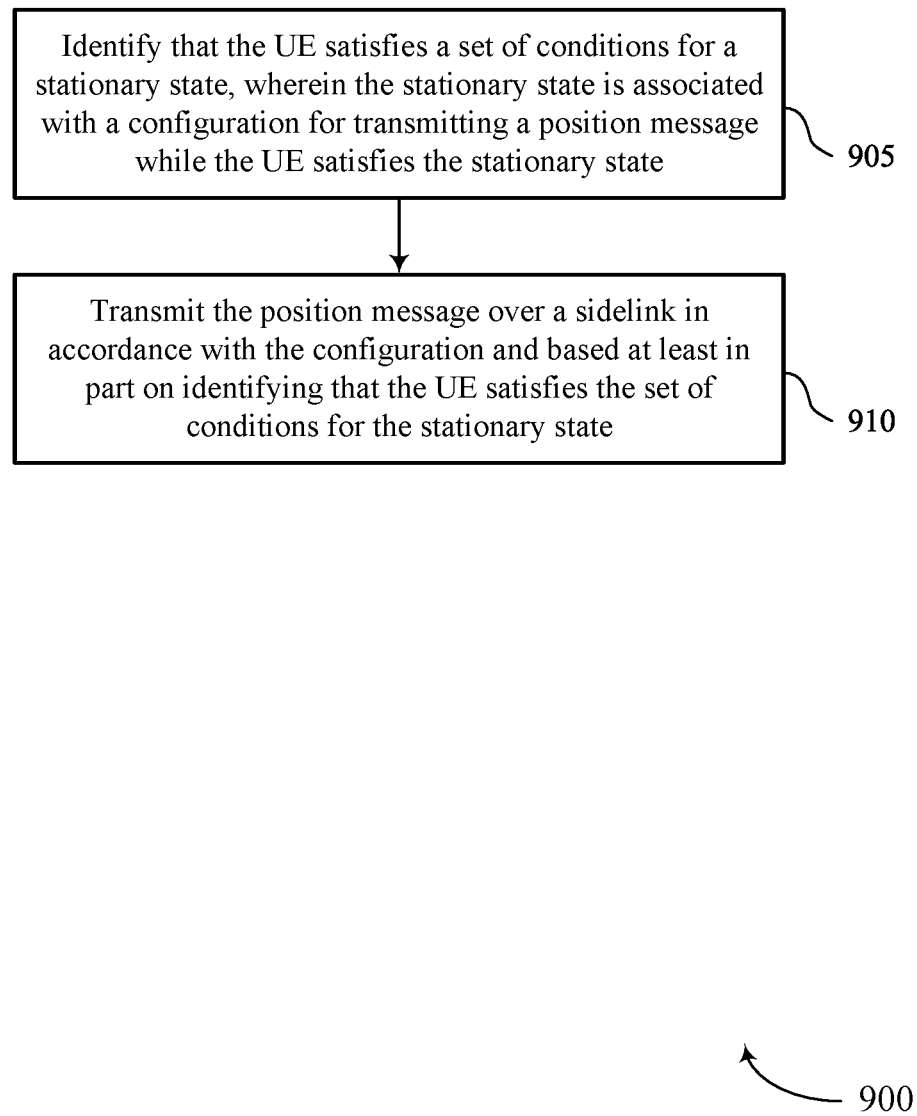
FIGS. 9 through 11 show flowcharts illustrating methods that support techniques for configuring transmission of a position message in accordance with aspects of the present disclosure.

FIG. 9 shows a flowchart illustrating a method 900 that supports techniques for configuring transmission of a position message in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying that the UE satisfies a set of conditions for a stationary state, where the stationary state is associated with a configuration for transmitting a position message while the UE satisfies the stationary state. The operations of 905 may be performed in accordance with examples as disclosed herein. In some examples, aspects of the operations of 905 may be performed by a stationary condition identification manager 725 as described with reference to FIG. 7.

At 910, the method may include transmitting the position message over a sidelink in accordance with the configuration and based on identifying that the UE satisfies the set of conditions for the stationary state. The operations of 910 may be performed in accordance with examples as disclosed herein. In some examples, aspects of the operations of 910 may be performed by a position message transmission manager 730 as described with reference to FIG. 7.

Figure 10:
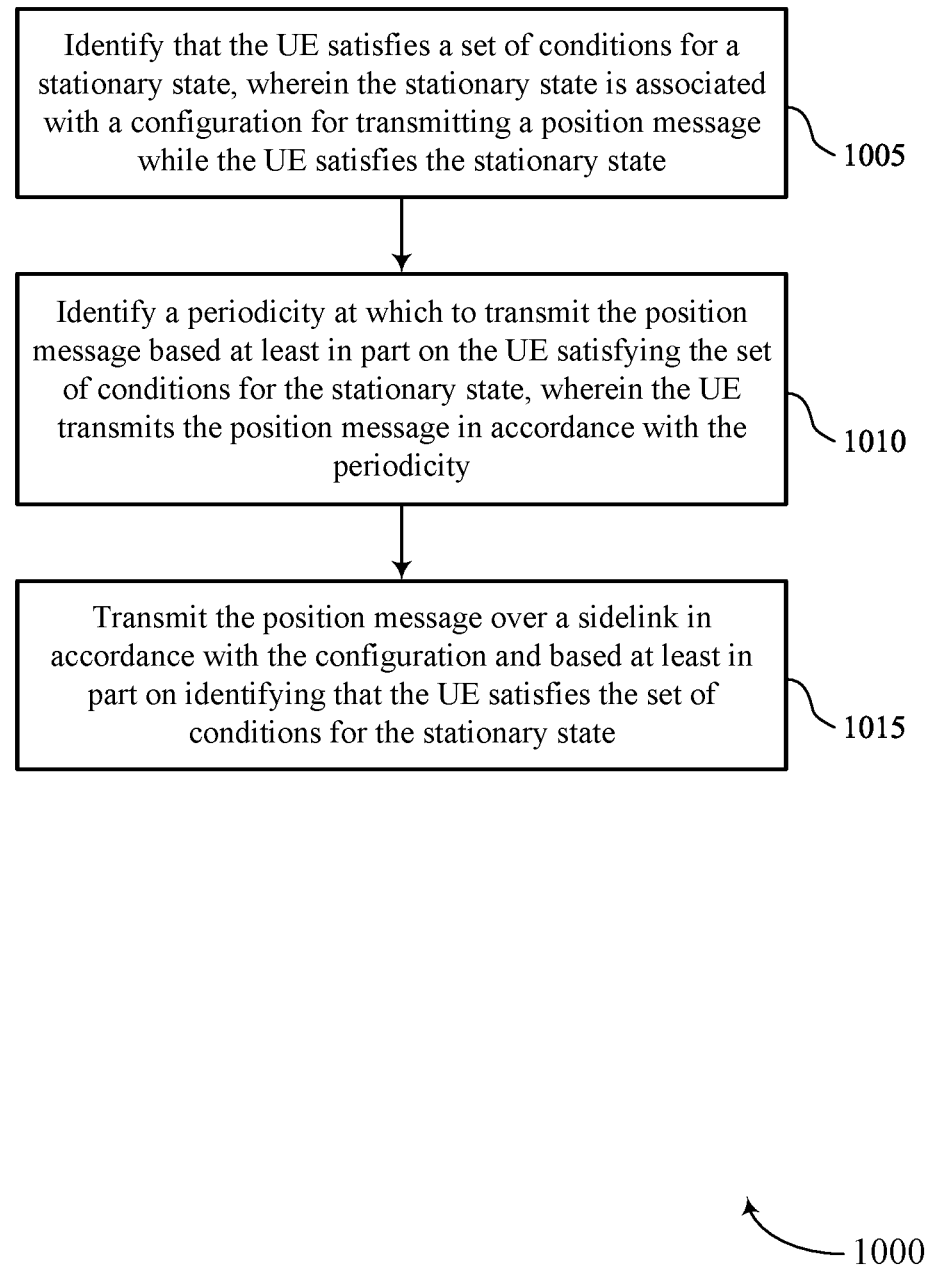

FIG. 10 shows a flowchart illustrating a method 1000 that supports techniques for configuring transmission of a position message in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying that the UE satisfies a set of conditions for a stationary state, where the stationary state is associated with a configuration for transmitting a position message while the UE satisfies the stationary state. The operations of 1005 may be performed in accordance with examples as disclosed herein. In some examples, aspects of the operations of 1005 may be performed by a stationary condition identification manager 725 as described with reference to FIG. 7.

At 1010, the method may include identifying a periodicity at which to transmit the position message based on the UE satisfying the set of conditions for the stationary state, where the UE transmits the position message in accordance with the periodicity. The operations of 1010 may be performed in accordance with examples as disclosed herein. In some examples, aspects of the operations of 1010 may be performed by a periodicity identification manager 735 as described with reference to FIG. 7.

At 1015, the method may include transmitting the position message over a sidelink in accordance with the configuration and based on identifying that the UE satisfies the set of conditions for the stationary state. The operations of 1015 may be performed in accordance with examples as disclosed herein. In some examples, aspects of the operations of 1015 may be performed by a position message transmission manager 730 as described with reference to FIG. 7.

Figure 11:
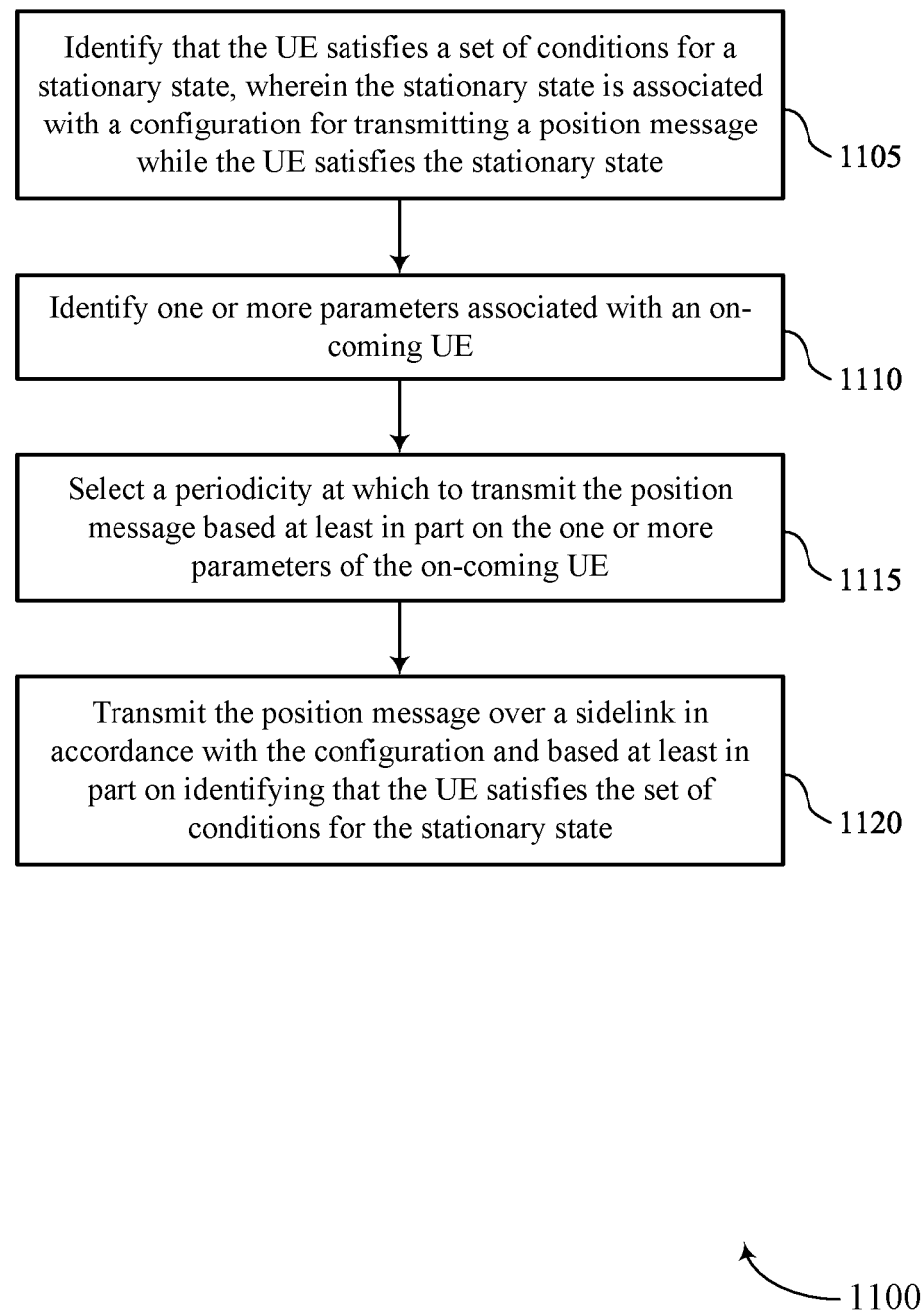

FIG. 11 shows a flowchart illustrating a method 1100 that supports techniques for configuring transmission of a position message in accordance with aspects of the present disclosure. The operations of the method 1100 may be implemented by a UE or its components as described herein.

For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying that the UE satisfies a set of conditions for a stationary state, where the stationary state is associated with a configuration for transmitting a position message while the UE satisfies the stationary state. The operations of 1105 may be performed in accordance with examples as disclosed herein. In some examples, aspects of the operations of 1105 may be performed by a stationary condition identification manager 725 as described with reference to FIG. 7.

At 1110, the method may include identifying one or more parameters associated with an on-coming UE. The operations of 1110 may be performed in accordance with examples as disclosed herein. In some examples, aspects of the operations of 1110 may be performed by a proximity identification manager 740 as described with reference to FIG. 7.

At 1115, the method may include selecting a periodicity at which to transmit the position message based on the one or more parameters of the on-coming UE. The operations of 1115 may be performed in accordance with examples as disclosed herein. In some examples, aspects of the operations of 1115 may be performed by a periodicity identification manager 735 as described with reference to FIG. 7.

At 1120, the method may include transmitting the position message over a sidelink in accordance with the configuration and based on identifying that the UE satisfies the set of conditions for the stationary state. The operations of 1120 may be performed in accordance with examples as disclosed herein. In some examples, aspects of the operations of 1120 may be performed by a position message transmission manager 730 as described with reference to FIG. 7.

The following provides an overview of aspects of the present disclosure:

- Aspect 1: A method for wireless communications at a UE, comprising: identifying that the UE satisfies a set of conditions for a stationary state, wherein the stationary state is associated with a configuration for transmitting a position message while the UE satisfies the stationary state; and transmitting the position message over a sidelink in accordance with the configuration and based at least in part on identifying that the UE satisfies the set of conditions for the stationary state.
- Aspect 2: The method of aspect 1, further comprising: identifying a periodicity at which to transmit the position message based at least in part on the UE satisfying the set of conditions for the stationary state, wherein the UE transmits the position message in accordance with the periodicity.
- Aspect 3: The method of aspect 2, wherein the periodicity at which to transmit the position message is greater than a default periodicity associated with transmitting the position message while the UE is in a non-stationary state.
- Aspect 4: The method of any of aspects 1 through 3, wherein the position message comprises a transmission state field in accordance with the configuration, the transmission state field indicating the stationary state of the UE.
- Aspect 5: The method of any of aspects 1 through 4, wherein the position message comprises a number of fields in accordance with the configuration, the number of fields included in the configuration is less than a number of fields included in a non-stationary state configuration.
- Aspect 6: The method of any of aspects 1 through 5, further comprising: identifying a periodicity at which to transmit the position message based at least in part on one or more environmental parameters of the UE.
- Aspect 7: The method of aspect 6, wherein identifying the periodicity further comprises: identifying that one or more additional UEs are within a threshold proximity of the UE and are in the stationary state; and identifying an increased periodicity at which to transmit the position messages based at least in part on one or more additional UEs being within a threshold proximity of the UE and being in the stationary state.
- Aspect 8: The method of any of aspects 6 through 7, wherein identifying the periodicity further comprises: identifying that one or more additional UEs are within a threshold proximity of the UE and are in the stationary state; and communicating with one or more additional UEs to identify a second configuration and a second periodicity for transmitting a second position message.
- Aspect 9: The method of aspect 8, wherein transmitting the position message further comprises: transmitting the position message in accordance with a first periodicity; and transmitting the second position message in accordance with the second periodicity based at least in part on the communicating.
- Aspect 10: The method of any of aspects 6 through 9, wherein the one or more environmental parameters comprise a location of the UE, a time of day, a density of neighboring UEs, a type of weather, or a combination thereof.
- Aspect 11: The method of aspect 10, wherein the location of the UE comprises a home garage, a parking lot, next to a bike lane, next to a curb, in a road, or a combination thereof.
- Aspect 12: The method of aspect 11, wherein the UE identifies a first periodicity when the UE is located in the home garage or the parking lot, and identifies a second periodicity when the UE is located next to the bike lane, next to the curb, or in the road, and the first periodicity is greater than the second periodicity.
- Aspect 13: The method of any of aspects 6 through 12, further comprising: identifying the one or more environmental parameters using a set of sensors on the UE, the set of sensors comprising a gyroscope, at least one inertial measurement unit, at least one camera, a lidar sensor, a radar sensor, or a combination thereof.
- Aspect 14: The method of any of aspects 1 through 13, further comprising: identifying one or more parameters associated with an on-coming UE; and selecting a periodicity at which to transmit the position message based at least in part on the one or more parameters of the on-coming UE.
- Aspect 15: The method of aspect 14, further comprising: determining a distance between the UE and the on-coming UE based at least in part on the one or more parameters, wherein selecting the periodicity is based at least in part on a comparison of the distance to a threshold.
- Aspect 16: The method of aspect 15, wherein the UE selects a first periodicity when the distance is less than the threshold and selects a second periodicity when the distance is greater than the threshold, the first periodicity less than the second periodicity.

Aspect 17: The method of any of aspects 14 through 16, wherein identifying the one or more parameters further comprises: identifying a heading of the on-coming UE, a speed of the on-coming UE, a location of the on-coming UE, or a combination thereof.

Aspect 18: The method of any of aspects 1 through 17, wherein the UE comprises a vehicle UE, and the set of conditions for the stationary state comprises the vehicle UE being parked and an engine of the vehicle UE being turned on.

Aspect 19: The method of any of aspects 1 through 18, wherein the UE comprises a vehicle UE, and the set of conditions for the stationary state comprises the vehicle UE being parked and an engine of the vehicle UE being turned off.

Aspect 20: The method of any of aspects 1 through 19, wherein the UE is a transmitter fixed to a location.

Aspect 21: An apparatus for wireless communications at a UE, comprising a processor; memory coupled with the processor; and instructions stored in the memory and executable by the processor to cause the apparatus to perform a method of any of aspects 1 through 20.

Aspect 22: An apparatus for wireless communications at a UE, comprising at least one means for performing a method of any of aspects 1 through 20.

Aspect 23: A non-transitory computer-readable medium storing code for wireless communications at a UE, the code comprising instructions executable by a processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    identifying that the UE is in a stationary state based at least in part on the UE satisfying a set of conditions for the stationary state, wherein the stationary state is associated with a configuration for transmitting a position message while the UE satisfies the set of conditions for the stationary state;
    determining a distance between the UE and an on-coming UE based at least in part on one or more parameters associated with the on-coming UE;
    selecting, as a parameter of the configuration and based at least in part on the distance, a periodicity at which to transmit the position message; and
    transmitting the position message over a sidelink in accordance with the configuration and based at least in part on the UE satisfying the set of conditions for the stationary state.

2. The method of claim 1, further comprising:
    identifying the periodicity at which to transmit the position message further based at least in part on the UE satisfying the set of conditions for the stationary state.

3. The method of claim 2, wherein the periodicity at which to transmit the position message is greater than a default periodicity associated with transmitting the position message while the UE is in a non-stationary state.

4. The method of claim 1, wherein the position message comprises a transmission state field in accordance with the configuration, the transmission state field indicating the stationary state of the UE.

5. The method of claim 1, wherein:
    the position message comprises a number of fields in accordance with the configuration; and
    the number of fields included in the configuration is less than a number of fields included in a non-stationary state configuration.

6. The method of claim 1, further comprising:
    identifying the periodicity at which to transmit the position message further based at least in part on one or more environmental parameters of the UE.

7. The method of claim 6, wherein identifying the periodicity further comprises:
    identifying that one or more additional UEs are within a threshold proximity of the UE and are in the stationary state; and
    identifying an increased periodicity at which to transmit the position message based at least in part on one or more additional UEs being within the threshold proximity of the UE and being in the stationary state.

8. The method of claim 6, wherein identifying the periodicity further comprises:
    identifying that one or more additional UEs are within a threshold proximity of the UE and are in the stationary state; and
    communicating with one or more additional UEs to identify a second configuration and a second periodicity for transmitting a second position message.

9. The method of claim 8, wherein transmitting the position message in accordance with the configuration further comprises:
    transmitting the position message in accordance with a first periodicity; and
    transmitting the second position message in accordance with the second periodicity based at least in part on the communicating.

10. The method of claim 6, wherein the one or more environmental parameters comprise a location of the UE, a time of day, a density of neighboring UEs, a type of weather, or a combination thereof.

11. The method of claim 10, wherein the location of the UE comprises a home garage, a parking lot, next to a bike lane, next to a curb, in a road, or a combination thereof.

12. The method of claim 11, wherein:
    the UE identifies the periodicity when the UE is located in the home garage or the parking lot, and identifies a second periodicity when the UE is located next to the bike lane, next to the curb, or in the road; and
    the periodicity is greater than the second periodicity.

13. The method of claim 6, further comprising:
    identifying the one or more environmental parameters using a set of sensors on the UE, the set of sensors comprising a gyroscope, at least one inertial measurement unit, at least one camera, a lidar sensor, a radar sensor, or a combination thereof.

14. The method of claim 1, wherein selecting the periodicity is based at least in part on a comparison of the distance to a threshold.

15. The method of claim 14, wherein the UE selects a first periodicity when the distance is less than the threshold and selects a second periodicity when the distance is greater than the threshold, the first periodicity less than the second periodicity.

16. The method of claim 1, further comprising:
    identifying the one or more parameters associated with the on-coming UE, wherein the one or more parameters include a heading of the on-coming UE, a speed of the on-coming UE, a location of the on-coming UE, or a combination thereof.

17. The method of claim 1, wherein the UE comprises a vehicle UE, and the set of conditions for the stationary state comprises the vehicle UE being parked and an engine of the vehicle UE being turned on.

18. The method of claim 1, wherein the UE comprises a vehicle UE, and the set of conditions for the stationary state comprises the vehicle UE being parked and an engine of the vehicle UE being turned off.

19. The method of claim 1, wherein the UE is a transmitter fixed to a location.

20. An apparatus for wireless communications at a user equipment (UE), comprising:
   a processor;
   memory coupled with the processor; and
   instructions stored in the memory and executable by the processor to cause the apparatus to:
      identify that the UE is in a stationary state based at least in part on the UE satisfying a set of conditions for the stationary state, wherein the stationary state is associated with a configuration for transmitting a position message while the UE satisfies the set of conditions for the stationary state;
      determine a distance between the UE and an on-coming UE based at least in part on one or more parameters associated with the on-coming UE;
      select, as a parameter of the configuration and based at least in part on the distance, a periodicity at which to transmit the position message; and
      transmit the position message over a sidelink in accordance with the configuration and based at least in part on the UE satisfying the set of conditions for the stationary state.

21. The apparatus of claim 20, wherein the instructions are further executable by the processor to cause the apparatus to:
   identify the periodicity at which to transmit the position message further based at least in part on the UE satisfying the set of conditions for the stationary state.

22. The apparatus of claim 21, wherein the periodicity at which to transmit the position message is greater than a default periodicity associated with transmitting the position message while the UE is in a non-stationary state.

23. The apparatus of claim 20, wherein the position message comprises a transmission state field in accordance with the configuration, the transmission state field indicating the stationary state of the UE.

24. The apparatus of claim 20, wherein:
   the position message comprises a number of fields in accordance with the configuration; and
   the number of fields included in the configuration is less than a number of fields included in a non-stationary state configuration.

25. The apparatus of claim 20, wherein the instructions are further executable by the processor to cause the apparatus to:
   identify the periodicity at which to transmit the position message further based at least in part on one or more environmental parameters of the UE.

26. The apparatus of claim 25, wherein the one or more environmental parameters comprise a location of the UE, a time of day, a density of neighboring UEs, a type of weather, or a combination thereof, and wherein the location of the UE comprises a home garage, a parking lot, next to a bike lane, next to a curb, in a road, or a combination thereof.

27. The apparatus of claim 26, wherein:
   the UE identifies the periodicity when the UE is located in the home garage or the parking lot, and identifies a second periodicity when the UE is located next to the bike lane, next to the curb, or in the road; and
   the periodicity is greater than the second periodicity.

28. An apparatus for wireless communications at a user equipment (UE), comprising:
   means for identifying that the UE is in a stationary state based at least in part on the UE satisfying a set of conditions for the stationary state, wherein the stationary state is associated with a configuration for transmitting a position message while the UE satisfies the set of conditions for the stationary state;
   means for determining a distance between the UE and an on-coming UE based at least in part on one or more parameters associated with the on-coming UE;
   means for selecting, as a parameter of the configuration and based at least in part on the distance, a periodicity at which to transmit the position message; and
   means for transmitting the position message over a sidelink in accordance with the configuration and based at least in part on the UE satisfying the set of conditions for the stationary state.

29. A non-transitory computer-readable medium storing code for wireless communications at a user equipment (UE), the code comprising instructions executable by a processor to:
   identify that the UE is in a stationary state based at least in part on the UE satisfying a set of conditions for the stationary state, wherein the stationary state is associated with a configuration for transmitting a position message while the UE satisfies the set of conditions for the stationary state;
   determine a distance between the UE and an on-coming UE based at least in part on one or more parameters associated with the on-coming UE;
   select, as a parameter of the configuration and based at least in part on the distance, a periodicity at which to transmit the position message; and
   transmit the position message over a sidelink in accordance with the configuration and based at least in part on the UE satisfying the set of conditions for the stationary state.

* * * * *